United States Patent
Foygel et al.

(10) Patent No.: US 11,688,008 B2
(45) Date of Patent: *Jun. 27, 2023

(54) PRIORITIZATION OF TRADE ORDER PROCESSING IN ELECTRONIC TRADING

(71) Applicant: TRADING TECHNOLOGIES INTERNATIONAL INC., Chicago, IL (US)

(72) Inventors: Alexander V. Foygel, Highland Park, IL (US); Bharat Mittal, Schaumburg, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,684

(22) Filed: Dec. 13, 2021

(65) Prior Publication Data

US 2022/0101436 A1 Mar. 31, 2022

Related U.S. Application Data

(63) Continuation of application No. 16/905,413, filed on Jun. 18, 2020, now Pat. No. 11,238,536, which is a continuation of application No. 15/637,911, filed on Jun. 29, 2017, now Pat. No. 10,726,480, which is a continuation of application No. 12/492,536, filed on Jun. 26, 2009, now Pat. No. 9,727,913.

(51) Int. Cl.
*G06Q 40/00* (2023.01)
*G06Q 40/04* (2012.01)

(52) U.S. Cl.
CPC .................................. *G06Q 40/04* (2013.01)

(58) Field of Classification Search
CPC ...................................................... G06Q 40/04
See application file for complete search history.

(56) References Cited

U.S. PATENT DOCUMENTS

| | | | |
|---|---|---|---|
| 4,682,284 A | 7/1987 | Schrofer | |
| 5,459,839 A | 10/1995 | Swarts et al. | |
| 5,613,204 A * | 3/1997 | Haberman | H04W 48/18 455/434 |
| 5,790,952 A * | 8/1998 | Seazholtz | H04W 8/18 370/349 |
| 6,536,037 B1 * | 3/2003 | Guheen | G06F 8/71 703/2 |
| 7,019,640 B2 | 3/2006 | Canich et al. | |

(Continued)

OTHER PUBLICATIONS

Electronic Trading in Financial Markets, Terrence Hendershott (Year: 2003).*

(Continued)

*Primary Examiner* — Bruce I Ebersman
(74) *Attorney, Agent, or Firm* — McDonnell Boehnen Hulbert & Berghoff LLP (57) ABSTRACT

Various systems and methods for trade order processing in an electronic trading environment are provided. According to one or more embodiments, two or more trade orders are currently queued for execution at one or more electronic exchanges and are to be modified at substantially the same time. Each trade order is processed according to a priority based on each order's proximity to a particular market price, for example.

22 Claims, 3 Drawing Sheets

(56) References Cited

U.S. PATENT DOCUMENTS

| | | | |
|---|---|---|---|
| 7,113,924 B2* | 9/2006 | Fishbain | G06Q 40/06 |
| | | | 705/37 |
| 7,124,110 B1 | 10/2006 | Kemp, II et al. | |
| 7,197,483 B2 | 3/2007 | Brady et al. | |
| 7,437,325 B2 | 10/2008 | Kemp, II et al. | |
| 7,461,009 B1 | 12/2008 | Haulk et al. | |
| 7,523,064 B2* | 4/2009 | Burns | G06Q 40/06 |
| | | | 705/37 |
| 7,613,647 B1 | 11/2009 | Cushing et al. | |
| 7,747,513 B2 | 6/2010 | Duquette et al. | |
| 7,801,129 B2 | 9/2010 | Batteram et al. | |
| 7,840,482 B2* | 11/2010 | Singla | G06Q 40/06 |
| | | | 705/37 |
| 7,933,830 B1* | 4/2011 | Buck | G06Q 40/04 |
| | | | 705/37 |
| 7,945,508 B2 | 5/2011 | Duquette et al. | |
| 7,980,457 B2 | 7/2011 | Kaminsky et al. | |
| 8,090,641 B1 | 1/2012 | Monroe | |
| 8,275,697 B2 | 9/2012 | Monroe | |
| 8,380,575 B2 | 2/2013 | Foygel et al. | |
| 8,380,610 B1* | 2/2013 | Nagle | G06Q 40/04 |
| | | | 705/37 |
| 8,626,637 B1* | 1/2014 | Gooch | G06Q 40/04 |
| | | | 705/37 |
| 9,727,913 B2 | 8/2017 | Foygel et al. | |
| 10,121,199 B1 | 11/2018 | McGovern et al. | |
| 10,402,902 B1* | 9/2019 | Isaacson | G06Q 40/04 |
| 10,726,480 B2 | 7/2020 | Foygel et al. | |
| 10,776,867 B2 | 9/2020 | Foygel et al. | |
| 11,238,536 B2 | 2/2022 | Foygel et al. | |
| 2002/0082967 A1* | 6/2002 | Kaminsky | G06Q 40/06 |
| | | | 705/37 |
| 2003/0236737 A1 | 12/2003 | Kemp, II et al. | |
| 2004/0233055 A1 | 11/2004 | Canich et al. | |
| 2005/0228743 A1* | 10/2005 | Warsaw | G06Q 40/04 |
| | | | 705/37 |
| 2006/0015436 A1* | 1/2006 | Burns | G06Q 40/04 |
| | | | 705/37 |
| 2006/0085320 A1* | 4/2006 | Owens | G06Q 40/00 |
| | | | 705/37 |
| 2007/0233593 A1 | 10/2007 | Claus et al. | |
| 2007/0253412 A1 | 11/2007 | Batteram et al. | |
| 2007/0265954 A1* | 11/2007 | Mather | G06F 3/0481 |
| | | | 705/37 |
| 2007/0294157 A1* | 12/2007 | Singla | G06Q 40/04 |
| | | | 705/36 R |
| 2008/0097887 A1 | 4/2008 | Duquette et al. | |
| 2008/0115079 A1* | 5/2008 | Mather | G06Q 40/04 |
| | | | 705/36 R |
| 2008/0162378 A1* | 7/2008 | Levine | G06Q 40/04 |
| | | | 705/37 |
| 2008/0208734 A1* | 8/2008 | Kaminsky | G06Q 40/04 |
| | | | 705/37 |
| 2008/0288391 A1 | 11/2008 | Downs et al. | |
| 2009/0055306 A1* | 2/2009 | Hirani | G06Q 40/06 |
| | | | 705/37 |
| 2009/0089199 A1 | 4/2009 | Waelbroeck et al. | |
| 2009/0132409 A1* | 5/2009 | Lutnick | G06Q 40/04 |
| | | | 705/37 |
| 2009/0164233 A1 | 6/2009 | Arnold et al. | |
| 2009/0187502 A1 | 7/2009 | Tully et al. | |
| 2009/0292637 A1* | 11/2009 | Taylor | G06Q 30/0283 |
| | | | 705/37 |
| 2010/0138334 A1* | 6/2010 | Warsaw | G06Q 40/04 |
| | | | 705/37 |
| 2010/0145843 A1* | 6/2010 | Janowski | G06Q 40/04 |
| | | | 705/37 |
| 2010/0228833 A1 | 9/2010 | Duquette et al. | |
| 2010/0238839 A1 | 9/2010 | Batteram et al. | |
| 2010/0332367 A1* | 12/2010 | Foygel | G06Q 40/04 |
| | | | 705/37 |
| 2011/0040669 A1 | 2/2011 | Lee et al. | |
| 2011/0145125 A1 | 6/2011 | Foygel et al. | |
| 2011/0184849 A1 | 7/2011 | Duquette et al. | |
| 2011/0238556 A1 | 9/2011 | Harmaty et al. | |
| 2012/0066115 A1 | 2/2012 | Monroe | |
| 2013/0138549 A1 | 5/2013 | Foygel et al. | |
| 2017/0301020 A1 | 10/2017 | Foygel et al. | |
| 2020/0320626 A1 | 10/2020 | Foygel et al. | |
| 2020/0380602 A1 | 12/2020 | Foygel et al. | |

OTHER PUBLICATIONS

Austrian Patent Office Search and Examination Report in Singapore, Application No. 201108943-0 dated Mar. 5, 2013.

Chiu, I. H-Y., "Securities Intermediaries in the Internet Age and the Traditional Principal-Agent Model of Regulation: Some Observations from European Union Securities Regulation," *Virginia Law & Business Review*, Fall 2007, vol. 2, No. 2, pp. 307-361.

Hendershott, T., "Electronic Trading in Financial Markets" IT Pro July | Aug. 1, 2003 pp. 10-14 (Year: 2003).

International Preliminary Report on Patentability, dated Jan. 12, 2012, for International Application No. PCT/US10/37106.

International Search Report of International Application No. PCT/US2010/037106 dated Jul. 30, 2010.

Kalagnanam, J. and D.C. Parkes. "Chapter 1: Auctions, Bidding and Exchange Design", In *Handbook of Quantitative Supply Chain Analysis: Modeling in the E-Business Era*, Eds. Simchi-Levi, S.D. and Z.S. Wu, Boston: Kluwer, 2004, pp. 143-212. [Retrieved on Oct. 18, 2012] from the Internet: http://nrs.harvard.edu/urn-3:HUL.InstRepos:4045845.

U.S. Appl. No. 12/492,536, Final Office Action dated Jan. 23, 2012.
U.S. Appl. No. 12/492,536, Non-Final Office Action dated Sep. 9, 2011.
U.S. Appl. No. 12/492,536, Non-Final Office Action dated Jun. 5, 2014.
U.S. Appl. No. 12/492,536, Final Office Action dated Nov. 25, 2014.
U.S. Appl. No. 12/492,536, Notice of Allowance dated Apr. 4, 2017.
U.S. Appl. No. 12/637,971, Non-Final Office Action dated Sep. 19, 2011.
U.S. Appl. No. 12/637,971, Non-Final Office Action dated Apr. 20, 2012.
U.S. Appl. No. 12/637,971, Notice of Allowance dated Nov. 2, 2012.
U.S. Appl. No. 13/745,287, Non-Final Office Action dated Feb. 2, 2015.
U.S. Appl. No. 13/745,287, Final Office Action dated Sep. 15, 2015.
U.S. Appl. No. 13/745,287, Non-Final Office Action dated Dec. 16, 2016.

\* cited by examiner

PRIORITIZATION OF TRADE ORDER PROCESSING IN ELECTRONIC TRADING

CROSS REFERENCE TO RELATED APPLICATIONS

This application is a continuation of U.S. patent application Ser. No. 16/905,413, filed Jun. 18, 2020, now U.S. Pat. No. 11,238,536, which is a continuation of U.S. patent application Ser. No. 15/637,911, filed Jun. 29, 2017, now U.S. Pat. No. 10,726,480, which is a continuation of U.S. patent application Ser. No. 12/492,536, filed Jun. 26, 2009, now U.S. Pat. No. 9,727,913, entitled "Prioritization of Trade Order Processing in Electronic Trading," the contents of each of which are fully incorporated herein by reference for all purposes.

BACKGROUND

The present invention is directed towards electronic trading. More particularly, embodiments of the present invention are directed towards trade order processing.

An electronic trading system provides for electronically matching orders to buy and sell items to be traded. The items may include, for example, stocks, options, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices. An example of an electronic exchange is the CME® Globex® electronic trading platform, which is offered by the Chicago Mercantile Exchange (CME).

Oftentimes, multiple trade orders may be queued for execution at an electronic exchange. These trade orders might require modification of some sort, even at substantially the same time. It is important then to provide tools that are related to processing the modification of orders.

BRIEF DESCRIPTION OF THE DRAWINGS

Example embodiments are described herein with reference to the following drawings.

The following will be better understood by a person skilled in the art when read in conjunction with the drawings which show various embodiments. The drawings are for the purpose of illustrating certain embodiments, but it is understood that the present invention is not limited to the arrangements and instrumentality shown in the drawings.

DETAILED DESCRIPTION

Various systems and methods are described herein for use in prioritizing the processing of modifications on trade orders that are currently pending at an electronic exchange. As an example, a purpose of a trade order modification may include changing an order price, changing an order quantity, or changing both the order price and order quantity, more of which is described below. The systems and methods are particularly useful by a client device, a gateway device, a server-side device, or some other intermediary device that is in communication with an electronic exchange, to determine which trade order modification to process first when two or more modifications are triggered at substantially the same time. The modification logic is executed for each trade order based on the priority.

In certain embodiments, the prioritization is based on computing a level of risk that a given trade order will get executed unmodified (e.g., before the desired modification has been implemented at the exchange), and comparing the level of risk across all pending orders that call for a modification. A modification of the trade order that has the highest risk of getting executed unmodified will get processed by the device first, until all of the trade order modifications have been processed.

In certain embodiments, the prioritization is based on the proximity of an order price of each trade order to be modified to a corresponding market price. The corresponding market price may be based on a best bid price, a best ask price, a last traded price, a theoretical price, or a combination of prices for a tradeable object. The corresponding market price for each trade order to be modified may be based on the same price indicator, or it may be based on a different price indicator. The modification of the trade order with an order price that is closest in proximity to its corresponding market price is processed first, for example. Additionally, prioritization can be based on other factors, more of which are described below.

In certain embodiments, the prioritization is based on the likelihood that a trade order, once modified, will be executed by the electronic exchange. The trade order with the highest chance of being executed, taking into account the current state of the market and the desired modification, will get processed by the device first, until all of the trade order modifications have been processed. Accordingly, the device attempts to modify a trade order first based on the increased chance that the order, once modified, will get executed when compared to other trade orders.

Figure 1:
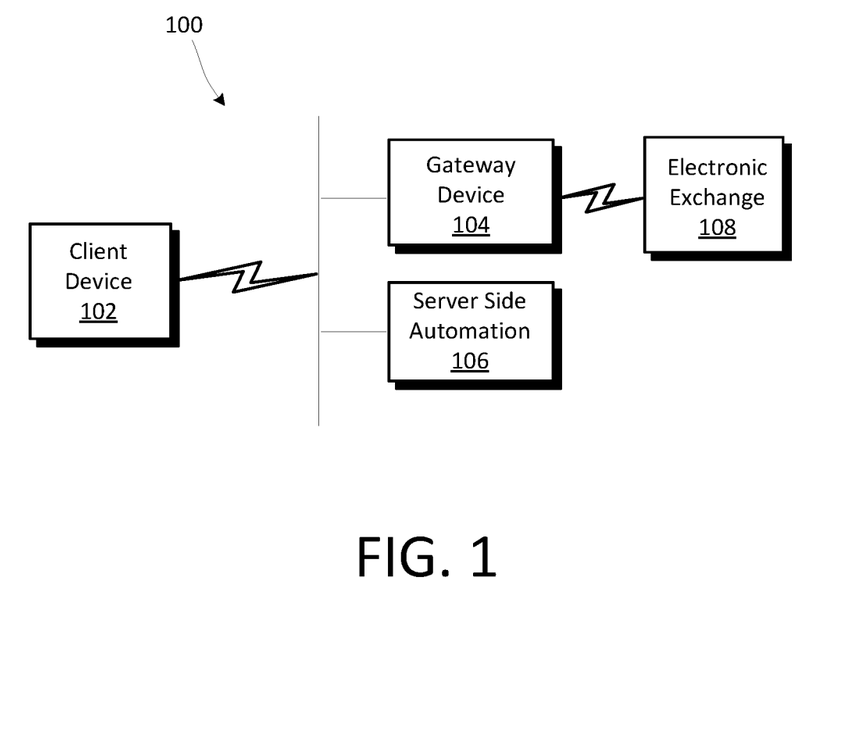
FIG. 1 illustrates an example electronic trading system in which certain embodiments may be employed.

FIG. 1 illustrates an example electronic trading system 100 in which certain embodiments may be employed. The system 100 includes client device 102, gateway device 104, server side automation device ("SSA") 106, and electronic exchange 108. According to this example, client device 102 is in communication with gateway 104. Gateway 104 is in communication with electronic exchange 108. SSA 106 may be in communication with client device 102 and gateway 104.

According to some operations, client device 102 may be utilized to send orders to buy or sell tradeable objects (e.g., trade orders) listed at exchange 108. Orders to be placed at exchange 108 via client device 102 are sent through gateway 104. In addition, market data may be sent from exchange 108 through gateway 104 to client device 102. The user may utilize client device 102 to monitor the market data and may base decisions to send an order for a tradeable object on the market data. Trading decisions at client device 102 may be manual or automated.

According to some operations, SSA 106 may be utilized to send orders to buy or sell tradeable objects at exchange 108 on behalf of the user of client device 102. Orders to be placed at exchange 108 via SSA 106 are sent through gateway 104. Market data may be sent from exchange 108 through gateway 104 to SSA 106. SSA 106 may monitor the market data and may base decisions to send an order for a tradeable object on the market data. Trading decisions at SSA 106 are generally automated, but it may be possible for a user of client device 102 to intervene manually, if SSA 106 is so programmed.

Client device 102 may include one or more electronic computing devices such as a hand-held device, laptop, personal computer, workstation with a single or multi-core processor, server with multiple processors, and/or cluster of computers, for example. A present day commercial example might include a computing device that utilizes the Windows XP® Professional operating system and has at least 2 GB of memory, two dual-core or two quad-core processors, a network card, and at least 10 GB of hard drive space to accommodate software.

Client device 102 may also be configured to run one or more trading applications. The trading application(s) may, for example, process market data by arranging and displaying the market data in trading and charting windows. This data processing may be based on user preferences, for example. In addition to manual style trading tools, the trading application(s) may include an automated trading tool such as an automated spread trading tool, for example. In another example, client device 102 may be a computing system running a copy of X_TRADER™, an electronic trading platform provided by Trading Technologies International, Inc. of Chicago, Ill. Regardless of the type of trading application, client device 102 may be configured to send orders to buy and sell tradeable objects listed at exchange 108. Client device 102 may also be configured to cancel orders, change orders, and/or query exchange 108, for example. Client device 102, including the one or more trading applications, may also be configured to operate with one or more trading applications at SSA 106, more of which are described below.

Orders sent by client device 102 may be sent at the request of a user, manually or automatically, for example. For example, a trader may utilize an electronic trading workstation to place an order for a particular tradeable object, manually providing various parameters for the order such as an order price and/or quantity. In another example, an automated trading tool may calculate one or more parameters for an order and automatically send the order.

In certain embodiments, client device 102 includes a user interface. The user interface may include one or more display devices for presenting a text-based or graphical interface to a user, for example. For example, the display devices may include computer monitors, hand-held device displays, projectors, and/or televisions. The user interface may be used by the user to specify or review parameters for an order. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, orders from client device 102 are sent on to exchange 108 through gateway 104. Client device 102 may communicate with gateway 104 using a local area network, a wide area network, a virtual private network, a T1 line, a T3 line, a point-of-presence, and/or the Internet, for example.

Server side automation ("SSA") 106 may include one or more electronic computing platforms such as a personal computer, workstation with a single or multi-core processor, server with multiple processors, and/or cluster of computers, for example. A present day commercial example might include a computing device that utilizes the Windows 2003 Server® (Server Pack 2) operating system and has at least 4 GB of memory, two dual-core or two quad-core processors, one or more network cards, and at least 30 GB of hard drive space to accommodate software.

In certain embodiments, SSA 106 is used to implement automated or semi-automated trading programs (collectively referred to herein as automated trading programs). Orders may be sent directly from SSA 106 to exchange 108 through gateway 104. Orders may also be sent from another computing device to exchange 108 via instructions from SSA, for example. In certain embodiments, SSA 106 is configured to implement an automated trading program on behalf of a user of client device 102. An example trading application that may run on SSA 106 is an automated spread trading tool like that disclosed in U.S. Pat. No. 7,437,325, the contents of which are incorporated herein by reference. The commercial embodiment of an automated spread trading tool is Autospreader®, which is offered by Trading Technologies International. The Autospreader® can be configured to operate at client device 102, SSA 106, or both client device 102 and SSA 106, for example.

In certain embodiments, SSA 106 is physically located at the same site as client device 102. In certain embodiments, SSA 106 is physically located at the same site as exchange 108. In certain embodiments, SSA 106 is collocated with gateway 104. In certain embodiments, SSA 106 is physically located at a site separate from both the client device 102 and the exchange 108. In certain embodiments, regardless of the location of SSA 106, client device 102 and SSA 106 may together be considered part of the "client side" of system 100, because SSA 106 may be operating on behalf of a user at client device 102, for example.

Gateway 104 may include one or more electronic computing platforms such as a personal computer, workstation with a single or multi-core processor, server with multiple processors, and/or cluster of computers, for example. In certain embodiments, gateway 104 is physically located at the same site as the client device 102. In certain embodiments, gateway 104 is physically located at the same site as exchange 108. In certain embodiments, gateway 104 is collocated with SSA 106. In certain embodiments, gateway 104 is physically located at a site separate from both the client device 102 and the exchange 108.

In certain embodiments, gateway 104 communicates with client device 102 and/or SSA 106 using a local area network, a wide area network, a virtual private network, a T1 line, a T3 line, a point-of-presence, and/or the Internet, for example.

Gateway 104 is adapted to communicate with client device 102 and exchange 108. Gateway 104 facilitates communication between client device 102 and/or SSA 106 and exchange 108. For example, gateway 104 may receive orders from client device 102 and/or SSA 106 and transmit the orders to exchange 108. As another example, gateway 104 may receive market data from exchange 108 and transmit the market data to client device 102 and/or SSA 106. Gateway 104 may be used to implement certain embodiments of the present invention.

In certain embodiments, gateway 104 performs processing on data communicated between client device 102 and/or SSA 106 and exchange 108. For example, gateway 104 may process an order received from client device 102 and/or SSA 106 into a data format acceptable by exchange 108. Similarly, gateway 104 may transform market data in an exchange-specific format received from exchange 108 into a format understood by client device 102 and/or SSA 106. The processing of gateway 104 may also include tracking orders from client device 102 and/or SSA 106 and updating the status of the order based on fill confirmations received from exchange 108, for example. As another example, gateway 104 may coalesce market data from exchange 108 and provide it to client device 102 and/or SSA 106.

Electronic exchange 108 is configured to match orders to buy and sell tradeable objects. The tradeable objects may be listed for trading at exchange 108. The orders may include orders received from the client device 102, SSA 106, or both, for example. Orders may be received from client device 102, SSA 106, or both through gateway 104, for example. In addition, the orders may be received from other devices in communication with exchange 108. That is, typically exchange 108 will be in communication with a variety of other client devices (which may be similar to client device 102) or other computing devices that also provide orders to be matched. As previously discussed, an example of electronic exchange 108 is the electronic trading platform offered by the CME®, which is presently headquartered in Chicago, Ill.

Exchange 108 is configured to provide market data. The market data may be provided to the client device 102, for example. The market data may be provided to client device 102, SSA 106, or both through gateway 104, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities (e.g., bids and offers) available at other prices away from the inside market. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, system 100 includes more than one client device 102. For example, multiple client devices similar to the client device 102, discussed above, may be in communication with gateway 104 and/or SSA 106 to send orders to the exchange 108. Similarly, in certain embodiments, system 100 includes more than one SSA 106.

In certain embodiments, system 100 includes more than one gateway 104. For example, multiple gateways similar to the gateway 104, discussed above, may be in communication with the client device 102 and/or SSA 106 and the exchange 104. Such an arrangement may be used to provide redundancy should gateway 104 fail, for example. System 100 might also include additional gateways to facilitate communication between client device 102 and/or SSA 106 and other exchanges besides exchange 108.

In certain embodiments, system 100 includes more than one exchange 108. For example, the gateway 104 may be in communication with multiple exchanges similar to the exchange 108, discussed above. Such an arrangement may allow client device 102 and/or SSA 106 to trade at more than one exchange through gateway 104, for example.

In certain embodiments, gateway 104 is part of client device 102 and/or SSA 106. For example, the hardware/software components of gateway 104 may be part of the same computing platform as the client device 102 and/or SSA 106. As another example, the functionality of gateway 104 may be performed by components of the client device 102 and/or SSA 106. In certain embodiments, gateway 104 is not present. Such an arrangement may occur when the client device 102 and/or SSA 106 does not need to utilize gateway 104 to communicate with exchange 108—for example, if client device 102 and/or SSA 106 have been adapted to communicate directly with exchange 108.

In certain embodiments, system 100 may include other devices that are specific to the communications architecture such as middleware, firewalls, hubs, switches, routers, exchange-specific communication equipment, modems, security managers, and/or encryption/decryption devices.

Figure 2:
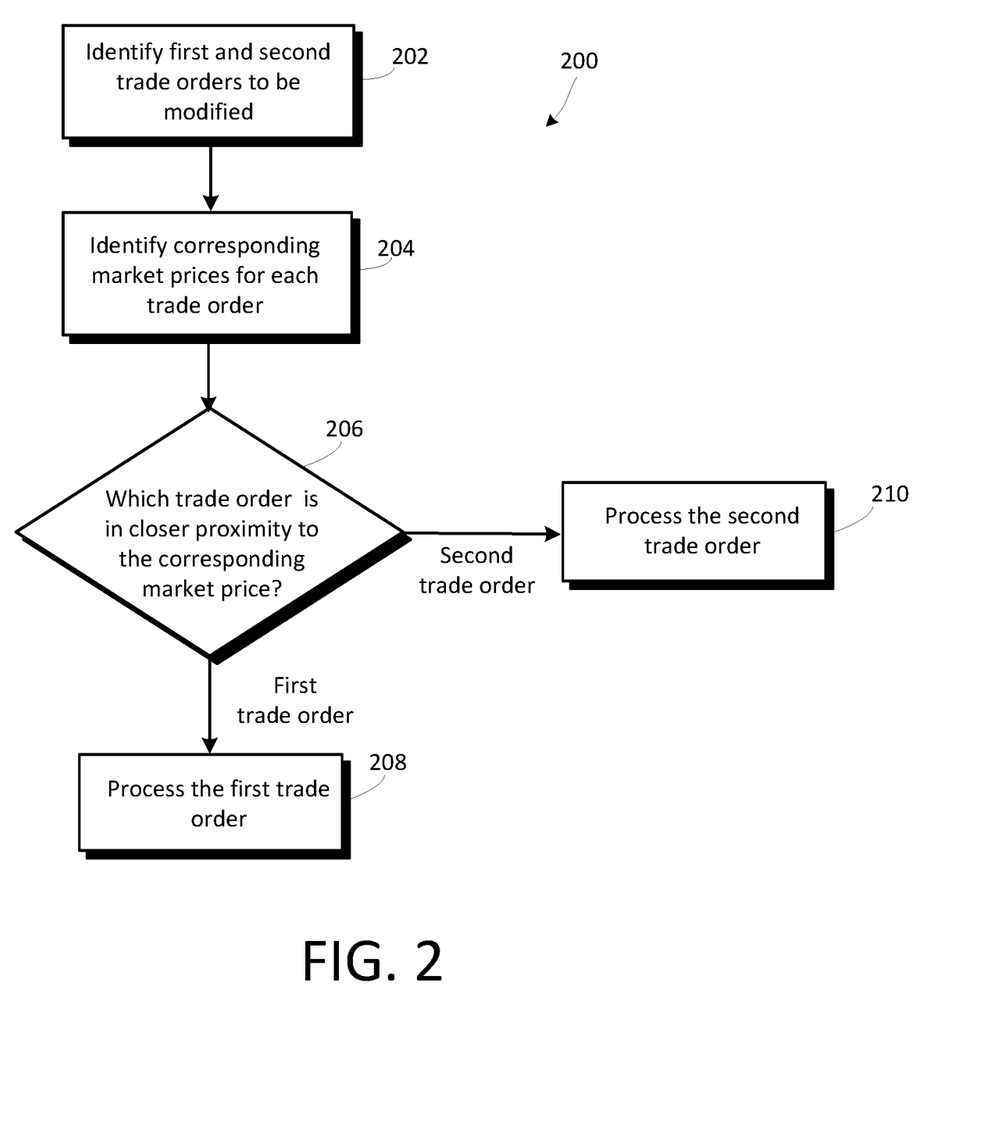
FIG. 2 illustrates a flowchart of a process for determining priority of processing two or more trade orders according to certain embodiments.

FIG. 2 illustrates a flowchart 200 of a process for use in prioritizing the processing of modifications on trade orders that are currently pending at an electronic exchange. As a preliminary matter, the flowchart 200 refers to a first trade order and a second trade order. As discussed above, a trade order refers to an order to buy or sell a quantity ("order quantity") of a particular tradeable object at a price ("order price"). It is to be understood that the first and second trade orders may be orders to buy/sell the same tradeable object, or alternatively, they may be orders to buy/sell different tradeable objects. Flowchart 200 similarly applies to situations when more than two orders are to be modified.

At block 202, first and second trade orders, which are currently queued for execution at an electronic exchange, are to be modified. For purposes of explanation, assume that the first trade order is residing in an order queue at a "first" electronic exchange and the second trade order is residing in an order queue at a "second" electronic exchange. It is to be understood that the two trade orders may be residing at the same electronic exchange (i.e., the first exchange may be the same exchange as the second exchange), or alternatively, the first trade order may be residing at a different exchange than the second trade order (i.e., first exchange may not be the same exchange as the second exchange).

A trade order may be modified for any number of reasons, but an example includes when a trading strategy calls for modifying a particular trade order in keeping with the definition and/or implementation of the trading strategy. Sometimes a modification is necessary when certain market conditions, such as those on which the trade order is based, change, for example. Thus, receipt of a market update from an electronic exchange or some other data may trigger a need for a modification on a trade order. Examples of a modification include re-pricing an order (e.g., changing the price of an existing order, or canceling the order and replacing it with an order at a new price), changing the order quantity, canceling the order altogether (not re-pricing it), changing an order type, changing an execution condition, changing an order link, or modifying any parameter related to the trade order. According to a specific example, an automated spread trading tool (e.g., implemented at SSA 106) might detect a market update for a tradeable object from an electronic exchange and consequently be required to re-price two or more trade orders as a result of the market update.

In addition, the systems and methods may be used all the time or part-time for use in prioritizing the processing of modifications. However, they are particularly useful when the modifications of the first and second trade orders are triggered at substantially the same time. For example, the modifications might be triggered at a time when a processor must make a decision to process one or the other trade order modification. The two or more trade orders could be from a single person (e.g., a trader) or from a group of people (e.g., a trading firm, bank, or some other trading entity).

At block 204, corresponding market prices for each trade order are identified. For example, if the first trade order is a bid, then its corresponding market price may be the lowest ask price for the tradeable object in which the first trade order is bidding. If the first trade order is an ask, then its corresponding market price may be the highest bid price for the tradeable object in which the first trade order is offering. In other words, in these two examples, the corresponding market prices are based on the opposite side of the market than the trade order. Additionally, the corresponding market price may include a last trade price or a theoretical price (e.g., a formula driven value like a moving average), or the market price may be based on a combination of two or more prices. In some embodiments, a corresponding market price might also be referred to as a market price indicator (or "indicator"), because a best bid, best ask, last trade price, or theoretical price may be considered an indicator whose underlying value changes in time (the underlying values are dynamic). Because the market prices may be different for each trade order (or even the same), the system may be configured to identify the "corresponding" market price for each trade order.

At block 206, a determination is made with respect to which of the trade orders is in closer proximity to its corresponding market price. This determination preferably optimizes the processing of trade orders by processing a modification for the trade order that exhibits a higher level of risk of getting executed unmodified (e.g., before the desired modification has been implemented at the exchange or before the desired modification has been communicated to the exchange) relative to the risk of having other trade order(s) executed unmodified. For example, if the first trade order price is bid at "100" and the market price used for comparison is "101," then the first trade order price is "1" price level away from the market price. If the second trade order price is offer at "78" (notice that in this example the second trade order is for a different tradeable object than the first trade order) and the market price used for comparison is "75," then the second trade order price is "3" price levels away from the market price. Based on this information, then it appears that the first trade order has a greater chance of execution, because its corresponding market price is within one price level of the trade order price. Consequently, the system would process a modification of the first trade order prior to processing a modification of the second trade order.

Prioritization can be based on other factors (or a combination of factors) in addition to proximity, or in place of proximity. For example, the system may not be in a position to modify the first trade order at that moment in time (e.g., because there is already an in-flight message to modify the first trade order). Consequently, the system may be configured to process a modification of the second trade order in this instance. Additionally, the system may be configured to look to the number of ticks (i.e., a tick represents the minimum upward or downward movement in the price of a tradeable object). For example, a tradeable object might tick in "0.25" increments versus "1." Using the example above, if the tradeable object of the first trade order ticks in "0.25" increments, but the tradeable object of the second trade order ticks in "1" increments, then the second trade order may appear to have a greater chance of execution (4 ticks for the first order versus 3 ticks for the second trade order). According to yet another example, the system might take into account the volatility or market movement of the tradeable object(s). If the two or more trade orders are for different tradeable objects, for example, and it is determined that the market for one tradeable object is moving slower than the market for the other tradeable object, then the system might view a trade order in the fast moving market at more risk, even if it is priced further away from the corresponding market price.

In other embodiments, the prioritization is based on the likelihood that a trade order, once modified, will be executed by the electronic exchange. The trade order with the highest chance of being executed, taking into account the current state of the market and the desired modification, will get processed by the system first, until all of the trade order modifications have been processed. Accordingly, the system attempts to modify a trade order first based on the increased chance that the order, once modified, will get executed. For example, if the first trade order price is bid at "100" and the market price used for comparison is "101," then the first trade order price is "1" price level away from the market price. If the modification of the first trade order involves changing the order price to "101," then the first trade order has a high chance of getting executed after the modification, considering that the modified price is equal to the market price used for comparison (which could be the lowest ask price, for example). The computed chance of execution may be determined for all of the trade orders that call for a modification, taking into account each trade order's desired modification and the respective market conditions. As such, the priority may go to the trade order that has the highest chance of getting executed when considering its desired modification.

In certain embodiments, if it is determined that at least two trade orders have equal priority, as determined using one or more factors described above, for example, then the trade order which has a possibility of a larger impact to the trader based on a parameter other than price can be processed first. For example, the trade order with the largest order quantity may be deemed to have a possibility of a larger impact if it gets executed unmodified. As such, the system may process the modification for the trade order with the largest order quantity, when two or more orders are considered to have equal priority using one or more of the above factors. In another example, market volatility and/or market movement may be used to determine which trade order to process first if at least two trade orders have equal priority.

In certain embodiments, if it is determined that at least two trade orders have equal priority, then the trade order modifications may be processed in a random manner, or alternatively, the modifications may be processed according to a certain predefined order. An example of randomizing is that the system uses a randomizer (e.g., a random generator) to determine which trade order modification is processed first. An example of modifying according to a predefined order is an embodiment that is based on first in, first out (FIFO), in which the system may be configured to process the oldest order first.

At block 208, it is determined to process the first trade order modification, whereas at block 210, it is determined to process the second trade order. A modification might include one or more steps that are taken by one or more computing devices towards modifying the trade order at the exchange. A step might include calculating a new order price, or some other order parameter, like order quantity. Another step might include generating a request message to modify. Yet another step might include sending the actual request message on to the exchange. Processing a modification, which might include calculating a new price, generating the request message, and sending the request message to the electronic exchange can take some processing time—for example, it could take as much as 100 microseconds in this example.

Once the first trade order is processed (if it is determined to have priority), then the system can process the modification of the second trade order, or vice-versa.

In certain embodiments, this process can be repeated until all of the trade order modifications have been processed. That is, if more than two trade orders call for a modification, the system may repeat the process, e.g., starting at step 202 or 204, after the first trade order modification is processed to determine which trade order is to be modified next. An advantage of determining priority in this manner is that it takes into account the most recent market prices for each trade order (based on the assumption that the market prices may change while processing trade order modifications). Additionally, it may take into account any new modifications that were triggered while modifications for one or more of the trade orders were being processed. If only two trade orders call for a modification, then the modification logic for the highest priority trade order will occur first, which can then be followed by the second trade order; in other words, the process of determining priority in this instance would not have to be repeated for each trade order.

Alternatively, the system may determine the priority for each trade order in a group of trade orders at according to flowchart 200, and then execute the modification logic correspondingly. That is, a priority may be assigned to each trade order for a group of trade orders (e.g., via step 206), and the modification logic can be executed for each trade order down the list of priority (e.g., from the highest priority to the lowest priority). The process may be repeated for any new modifications after the group trade order modifications are complete. As another option, a priority may be individually assigned to any new modification, and then the system may adjust the list of priority accordingly to accommodate the new modification(s) based on its priority assignment.

Figure 3:
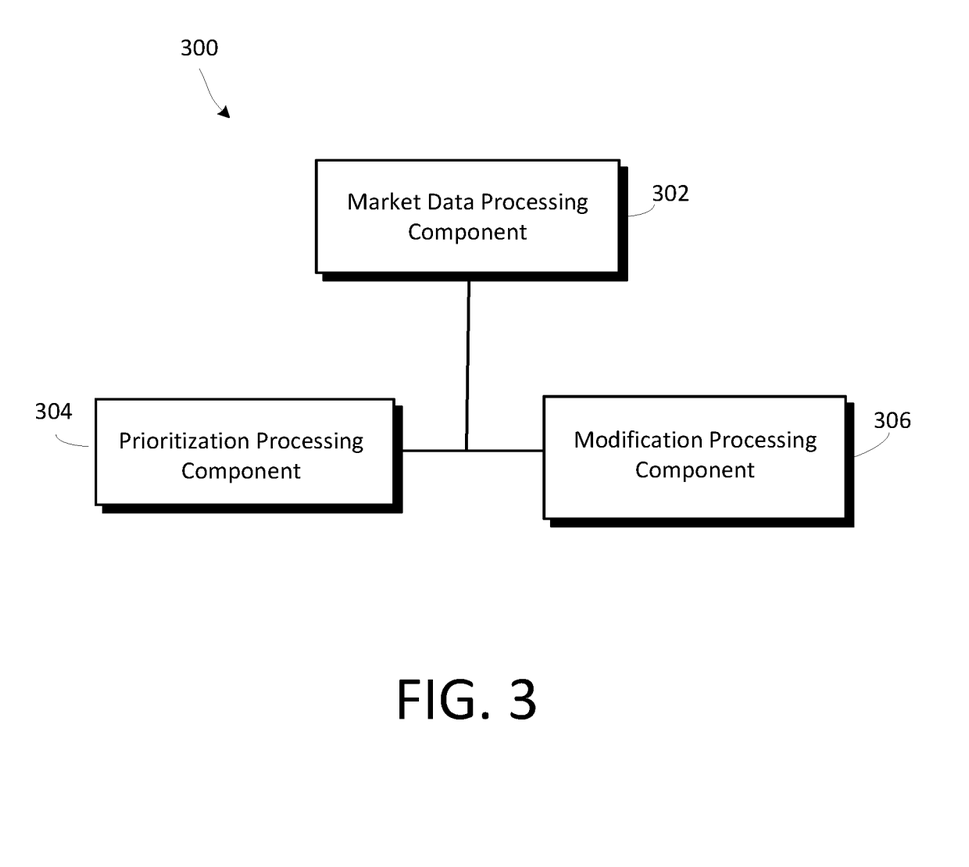
FIG. 3 illustrates a system for use in electronic trading using a technique according to certain embodiments.

FIG. 3 illustrates a system 300 for using a technique according to an embodiment. The system 300 includes a market data processing component 302, a prioritization processing component 304, and a modification processing component 306. The components 302, 304, and 306 may be implemented by one or more computing devices. For example, components 302, 304, and 306 might be part of SSA 106 in FIG. 1, client device 102, a combination of SSA 106 and client device 102, electronic exchange 108, or a part of some other computing device or combination of computing devices.

In operation, modification processing component 306 is configured to identify at a substantially equal time that at least a first trade order and a second trade order are to be modified. The first and second trade orders are currently queued for execution at an electronic exchange. The market data processing component 302 is configured to retrieve the corresponding market prices for each trade order. System 300 may be configured, for example, so that a corresponding market price is a best bid price if the trade order is an order to sell, a best ask price if the trade order is an order to buy, a last trade price, or is represented by some other designated price or indicator. Prioritization processing component 304 is configured to determine which trade order modification to process first given that the modifications are triggered at substantially the same time. In certain embodiments, priority may be given to the trade order that is closest in proximity to the corresponding market price, for example, thereby indicating a higher level of chance of getting executed before the other trade order. Additionally, as discussed above, prioritization processing component 304 might base the priority on a combination of factors or on other factors (e.g., in-flight transactions, and so on). Modification processing component 306 is configured to process the modification of the trade order that has priority.

A Spread Trading Example According to Certain Embodiments

Assume the following scenario:
Creation of a two-legged synthetic spread AB, which comprises buying contract A (e.g., buying leg A) and selling contract B (e.g., selling leg B).
The spread is configured to quote leg A based on market conditions in leg B.
The current inside markets for both contracts are as follows:
Contract A: Bid at 98, Ask at 100
Contract B: Bid at 96, Ask at 98
A desire to buy the AB spread at 1 is set. In response, an automated trading engine submits a buy order for contract A at 97. That price is calculated as a sum of the currently existing bid price for contract B (e.g., 96) and the desired spread AB price (e.g., 1), which is Bid B+Bid AB=96+1=97. Sometime later, a desire to buy the AB spread at 3 is also set. In response, the automated trading engine submits a buy order for contract A at 99 (e.g., Bid B+Bid AB=96+3=99). As such, there are two trade orders that are queued for execution in contract A
A first trade order to buy contract A at 97.
A second trade order to buy contract A at 99.
Now, assume that the bid price for contract B moves down to 95. Responsive to the change in bid price in contract B, the automated trading engine ideally would like to re-quote the first trade order to 96 (e.g., 95+1) and the second trade order to 98 (e.g., 95+3) to maintain the desired spread prices (e.g., 1 and 3). Each re-quote is referred to as a modification.

Conventionally, each of the trade orders is processed according to the time when they were originally placed, i.e., the oldest queued order first. Using convention, the first trade order would be processed first in this example. However, the system prioritizes the processing of the two orders based on their proximity to the other side of the market, for instance. In this example, the second trade order is closer to the other side of the market than the first trade order. That is, the first trade order is 3 price levels away from the Ask of 100 (e.g., compare 97 to 100) versus the second trade order is 1 price level away from the Ask of 100 (e.g., compare 99 to 100). Consequently, the system would process the second trade order first, and then proceed to process the first trade order. Likely, the system would then send a message to the exchange to re-price the second trade order to 98 and then re-price the first trade order to 96.

In the example above, the two trade orders were compared to the same indicator (e.g., the ask price), because they were both trade orders to buy the same tradeable object. However, as discussed above, the two trade orders could be different in that one trade order could be an offer, whereas the other trade order could be a bid. Also, the trade orders could be for different tradeable objects at the same or different exchange(s). The trade orders could also originate from the same or different trading strategies.

Irrespective of these specific examples, if the system (e.g., SSA 106, client device 102, or a combination of SSA 106 and client device 102 in FIG. 1) needs to modify two or more orders at substantially the same time, the system can prioritize which order is processed first based on each order's proximity to a particular market price. As a result, the system may reduce the chances of getting legged and/or missing an opportunity in the market. For instance, contrary to the example above, if the first trade order is re-priced prior to the second trade order, then it may be more likely that the second trade order is executed during the time it takes to process the first trade order (given that the second trade order is closer in proximity to the ask price). Consequently, there is a greater chance that the spread strategy for the second trade order would get legged, or an unintended spread price would result due to changing market conditions.

As used herein, a "tradeable object" refers to anything that can be traded with a price, a quantity, or both price and quantity. For example, financial products such as stocks, options, bonds, futures, currency, warrants, funds derivatives, commodities, and collections or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread. A tradeable object may also include traded events or goods, for example.

One or more of the blocks of the flowchart discussed above may be implemented alone or in combination in various forms in hardware, firmware, or as a set of instructions in software, for example. Certain embodiments may be provided as a set of instructions residing on a computer-readable medium, such as a memory, hard disk, CD-ROM, DVD, or EPROM, for execution on a computer or other processing device.

Certain embodiments may omit one or more of these steps or perform the steps in a different order than the order listed. For example, some steps may not be performed in certain embodiments. As a further example, certain steps may be performed in a different temporal order, including simultaneously, than listed above.

Additionally, as described above, various computing devices may be configured to implement various aspects described herein. For example, the SSA 106 may be configured to implement the embodiments described herein. Thus, for example, if a software trading application at SSA 106 generated a number of trade orders at substantially the same time, then the embodiments described herein may be utilized to prioritize the processing of such orders. In another example, the client device 102 may be configured to implement the embodiments described herein. Alternatively, a combination of the client device 102 and SSA 106 may be configured to jointly implement the embodiments described herein.

While the invention(s) has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A non-transitory computer readable medium having stored therein instructions executable by a processor, including instructions executable to:

identify by a gateway device that a first trade order and a second trade order are to be modified at substantially the same time, wherein the first trade order is currently queued for execution at a first electronic exchange, wherein the second trade order is currently queued for execution at a second electronic exchange;

determine by an automation computing device in communication with the gateway device, in response to identifying that the first trade order and the second trade order are to be modified, a first priority factor for the first trade order, wherein the first priority factor is based on a difference between a first modified price for the first trade order and a corresponding first market price, wherein the first modified price is what a price for the first trade order will be as a result of processing a modification for the first trade order;

determine by the automation computing device, in response to identifying that the first trade order and the second trade order are to be modified, a second priority factor for the second trade order, wherein the second priority factor is based on a difference between a second modified price for the second trade order a corresponding second market price, wherein the second modified price is what a price for the second trade order will be as a result of processing a modification for the second trade order;

detect by the automation computing device that the first priority factor and the second priority factor are equal;

determine by the automation computing device, in response to detecting that the first priority factor and the second priority factor are equal, a third priority factor for the first trade order wherein the third priority factor is based on a quantity of the first trade order;

determine by the automation computing device, in response to detecting that the first priority factor and the second priority factor are equal, a fourth priority factor for the second trade order wherein the third priority factor is based on a quantity of the second trade order;

process by the automation computing device the modification for the first trade order prior to processing the modification for the second trade order when the third priority factor is larger than the fourth priority factor by sending a first request message to the first electronic exchange to modify the first trade order, and subsequently sending a second request message to the second electronic exchange to modify the second trade order; and process by the automation computing device the modification for the second trade order prior to processing the modification for the first trade order when the fourth priority factor is larger than the third priority factor by sending a second request message to the second electronic exchange to modify the second trade order, and subsequently sending a first request message to the first electronic exchange to modify the first trade order.

2. The non-transitory computer readable medium of claim 1, wherein the first electronic exchange is the same electronic exchange as the second electronic exchange.

3. The non-transitory computer readable medium of claim 1, wherein the first electronic exchange is a different electronic exchange than the second electronic exchange.

4. The non-transitory computer readable medium of claim 1, wherein the first trade order is for the same tradeable object as the second trade order.

5. The non-transitory computer readable medium of claim 1, wherein the first trade order is for a different tradeable object than the second trade order.

6. The non-transitory computer readable medium of claim 1, wherein at least one of the modification of the first trade order and the modification of the second trade order includes modifying an order parameter.

7. The non-transitory computer readable medium of claim 6, wherein the order parameter is one of: an order quantity and an order price.

8. The non-transitory computer readable medium of claim 1, wherein one of the modification of the first trade order and the modification of the second trade order includes canceling the corresponding trade order.

9. The non-transitory computer readable medium of claim 1, wherein the corresponding first market price and the corresponding second market price represent a same price indicator for the first trade order and the second trade order.

10. The non-transitory computer readable medium of claim 1, wherein the corresponding first market price and the corresponding second market price represent a different price indicator for the first trade order and second trade order.

11. The non-transitory computer readable medium of claim 1, wherein the at least one of the corresponding first market price and the corresponding second market price is based on at least one of: a best bid price, a best ask price, a last traded price, and a theoretical price.

12. A system including:
a computing device including a modification processing component and a prioritization processing component,
wherein the computing device is configured to identify by a gateway device that a first trade order and a second trade order are to be modified at substantially the same time, wherein the first trade order is currently queued for execution at a first electronic exchange, wherein the second trade order is currently queued for execution at a second electronic exchange;
wherein the computing device is configured to determine by an automation computing device in communication with the gateway device, in response to identifying that the first trade order and the second trade order are to be modified, a first priority factor for the first trade order, wherein the first priority factor is based on a difference between a first modified price for the first trade order and a corresponding first market price, wherein the first modified price is what a price for the first trade order will be as a result of processing a modification for the first trade order;
wherein the computing device is configured to determine by the automation computing device, in response to identifying that the first trade order and the second trade order are to be modified, a second priority factor for the second trade order, wherein the second priority factor is based on a difference between a second modified price for the second trade order a corresponding second market price, wherein the second modified price is what a price for the second trade order will be as a result of processing a modification for the second trade order;
wherein the computing device is configured to detect by the automation computing device that the first priority factor and the second priority factor are equal;
wherein the computing device is configured to determine by the automation computing device, in response to detecting that the first priority factor and the second priority factor are equal, a third priority factor for the first trade order wherein the third priority factor is based on a quantity of the first trade order;
wherein the computing device is configured to determine by the automation computing device, in response to detecting that the first priority factor and the second priority factor are equal, a fourth priority factor for the second trade order wherein the third priority factor is based on a quantity of the second trade order;
wherein the computing device is configured to process by the automation computing device the modification for the first trade order prior to processing the modification for the second trade order when the third priority factor is larger than the fourth priority factor by sending a first request message to the first electronic exchange to modify the first trade order, and subsequently sending a second request message to the second electronic exchange to modify the second trade order; and
wherein the computing device is configured to process by the automation computing device the modification for the second trade order prior to processing the modification for the first trade order when the fourth priority factor is larger than the third priority factor by sending a second request message to the second electronic exchange to modify the second trade order, and subsequently sending a first request message to the first electronic exchange to modify the first trade order.

13. The system of claim 12, wherein the first electronic exchange is the same electronic exchange as the second electronic exchange.

14. The system of claim 12, wherein the first electronic exchange is a different electronic exchange than the second electronic exchange.

15. The system of claim 12, wherein the first trade order is for the same tradeable object as the second trade order.

16. The system of claim 12, wherein the first trade order is for a different tradeable object than the second trade order.

17. The system of claim 12, wherein at least one of the modification of the first trade order and the modification of the second trade order includes modifying an order parameter.

18. The system of claim 17, wherein the order parameter is one of: an order quantity and an order price.

19. The system of claim 12, wherein one of the modification of the first trade order and the modification of the second trade order includes canceling the corresponding trade order.

20. The system of claim 12, wherein the corresponding first market price and the corresponding second market price represent a same price indicator for the first trade order and the second trade order.

21. The system of claim 12, wherein the corresponding first market price and the corresponding second market price represent a different price indicator for the first trade order and second trade order.

22. The system of claim 12, wherein the at least one of the corresponding first market price and the corresponding second market price is based on at least one of: a best bid price, a best ask price, a last traded price, and a theoretical price.

* * * * *